United States Patent [19]

McCall

[11] Patent Number: 4,913,126
[45] Date of Patent: Apr. 3, 1990

[54] OUTDOOR STOVE/HEATER

[76] Inventor: Thomas G. McCall, 5025 Genesee Rd., Lapeer, Mich. 48446

[21] Appl. No.: 307,043

[22] Filed: Feb. 7, 1989

[51] Int. Cl.⁴ .............................................. A61F 7/00
[52] U.S. Cl. .................................... 126/204; 126/206; 126/4
[58] Field of Search .......................... 126/93, 204–208, 126/59, 248, 43, 37, 59, 38, 4, 44, 46, 59.5

[56] References Cited

U.S. PATENT DOCUMENTS

| | | | |
|---|---|---|---|
| 208,251 | 9/1878 | Mains | 126/208 |
| 2,567,323 | 9/1951 | Cyphert | 126/208 |
| 2,614,514 | 10/1952 | Martindale et al. | 126/93 |
| 2,829,635 | 4/1958 | Teller | 126/208 |
| 2,904,031 | 9/1959 | Scott | 126/204 |
| 3,105,487 | 10/1963 | Anderson | 126/271.3 |
| 3,200,809 | 8/1965 | Suchowolec | 126/92 |
| 3,387,401 | 6/1968 | Stelmach | 43/17 |
| 3,408,998 | 11/1968 | Brancato et al. | 126/4 |
| 4,347,737 | 9/1982 | Beach | 73/159 |
| 4,351,314 | 9/1982 | Morton | 126/59 |
| 4,414,956 | 11/1983 | Webber | 126/59 |
| 4,475,532 | 10/1984 | Woods | 126/204 |
| 4,481,408 | 11/1984 | Scheufler | 126/25 B |
| 4,495,935 | 1/1985 | Lanier | 126/204 |
| 4,676,223 | 6/1987 | Peterson | 126/208 |
| 4,708,122 | 11/1987 | Rock | 126/43 |

*Primary Examiner*—James C. Yeung
*Attorney, Agent, or Firm*—Gifford, Groh, Sprinkle, Patmore and Anderson

[57] ABSTRACT

A portable outdoor stove/heater for use by outdoorsmen. The heater has a container for containing solid combustible fuel and a seat top which is heat conductive for sitting. The seat top does not extend fully across the open top to permit access to heat for the warming of hands. A pair of arms are mounted to the container to support a fishing pole for ice fishing. A grate may be located in position within the container for heating or cooking food.

10 Claims, 2 Drawing Sheets

OUTDOOR STOVE/HEATER

BACKGROUND OF THE INVENTION

I. Field of the Invention

The present invention relates to stove/heater devices and, more particularly, to stove/heater devices for winter outdoorsmen

II. Description of the Prior Art

Frequently, winter outdoorsmen such as ice fishermen and hunters spend a considerable amount of time in a particular location during cold weather. Ice fishermen in particular spend a considerable amount of time in one spot on the ice holding a fishing rod. Containers for building fires for cooking food and heating the body while outdoors are well known.

Disclosed in U.S. Pat. No. 4,351,314 is a portable heater having a symmetrical, cylindrical body which utilizes sterno and/or charcoal as a fuel for heating. The portable heater has a lid which may be snuggly fit about the top portion of the body for extinguishing the fire.

It would be advantageous to have a heating device which would act as a heater for both the body and hands of the outdoorsman, simultaneously heat and cook the outdoorsman's food, as well as act as a seat and support for equipment, such as fishing poles.

SUMMARY OF THE PRESENT INVENTION

The present invention thus provides a compact and easily transportable stove/heater device for use by winter outdoorsmen, particularly ice fishermen. A container having an elongated cylindrical body with an opening at a top end and a closed bottom portion is provided for containing a solid fuel fire. The fire is supported within the cylinder on a secondary bottom. Holes are formed in a lower portion of the cylinder for supplying air to the fire.

A seat top is adapted to extend partially over the opening of the cylindrical body. The seat top is heat conductive to provide heat, and is adapted to permit the outdoorsman to sit on the cover for warming. The remainder of the opening not closed by the seat top permits heat to rise out of the cylinder to permit warming of the hands. The seat top is dimensioned to be received within the container during storage or relocation of the heater device.

A grate is provided for the heating and cooking of food within the container. The grate is movable between a lower position for cooking and an upper position for heating or warming of food. A pair of arms are formed on the body to support a fishing rod so that the fisherman is not required to continuously hold the rod while fishing.

BRIEF DESCRIPTION OF THE DRAWING

A better understanding of the present invention will be had upon reference to the following detailed description, when read in conjunction with the accompanying drawing, wherein like reference characters refer to like parts throughout the several views, in which.

DETAILED DESCRIPTION OF THE PREFERRED EMBODIMENTS OF THE PRESENT INVENTION

Figure 2:
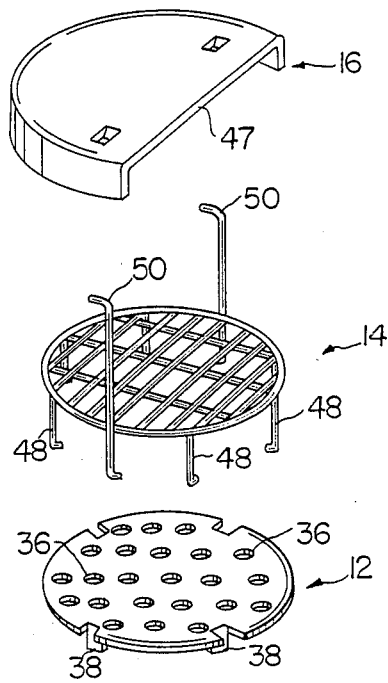
FIG. 2 is an exploded perspective view of a seat top, grill, grate, secondary bottom, and body according to the invention.

As best shown in FIG. 2, a stove/heater according to the invention includes a container 10, a secondary bottom plate 12, a grate 14, and a seat top 16. The container or bucket has an elongated body 18 having a solid bottom 20 and arm 21 defining an open top 22. The container may be of any suitable configuration such as cylindrical frustroconical and is formed of a suitable rigid material capable of withstanding the heat from a fire, such as steel. The elongated body 18 has a maximum length sufficient to support the seat top 16 at a level for supporting a person in a sitting position. The container has a plurality of holes 24 extending about a bottom portion of the cylindrical body to permit the passage of air into the heater for combustion. Two standoffs 28 are formed in opposing sides of the body to accept a conventional handle 26.

Figure 1:
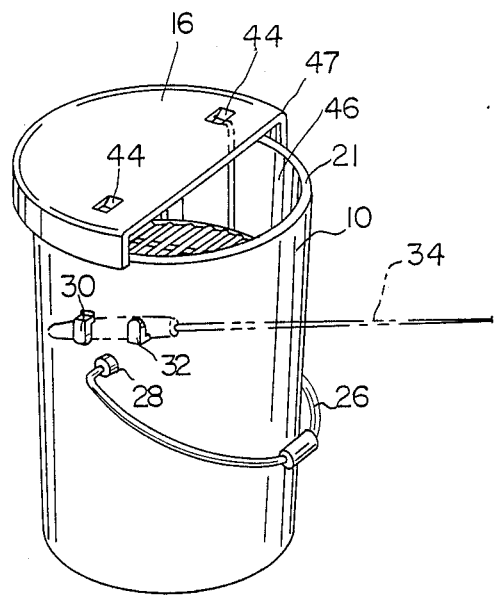
FIG. 1 is a perspective view of the portable outdoor heater according to the invention.

A downward opening arm 30 and an upwardly opening arm 32 extend from an upper portion of the body 18 to support a fishing pole 34, as shown in FIG. 1. The arms 30 and 32 are spaced apart and are of a suitable shape, such as L-shaped or curved, to firmly support the fishing rods. The arms 30 and 32 are affixed to the body in a satisfactory manner, such as welding.

Figure 3:
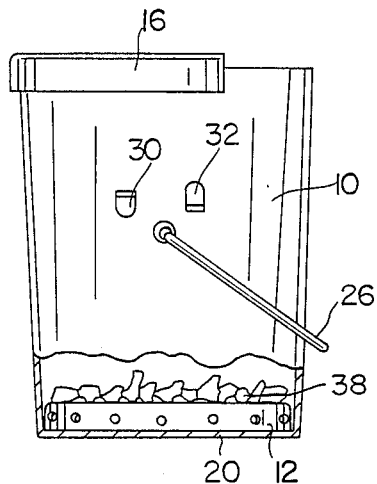
FIG. 3 is a fragmentary side view of the heater according to the invention.

As shown in FIG. 2, the secondary bottom plate 12 is formed of a circular disk of metal having a plurality of apertures 36 and legs 38. As best shown in FIG. 3, the bottom plate 12 is positioned within the container 10 to support combustible material 38. In the preferred embodiment, solid combustible material such as charcoal is utilized. The bottom plate 12 is spaced apart from the bottom 20 of the container by the legs 38 to permit air from the plurality of holes 24 to pass through the apertures 36 of the bottom plate for combustion.

The seat top 16, as best shown in FIG. 2, extends partially over the open top 22 of the container 10. The seat top 16 may be formed of any suitable rigid heat conducting material, such as aluminum or steel, which is suitable for supporting the weight of a person and withstanding the heat of combustion.

Figure 4:
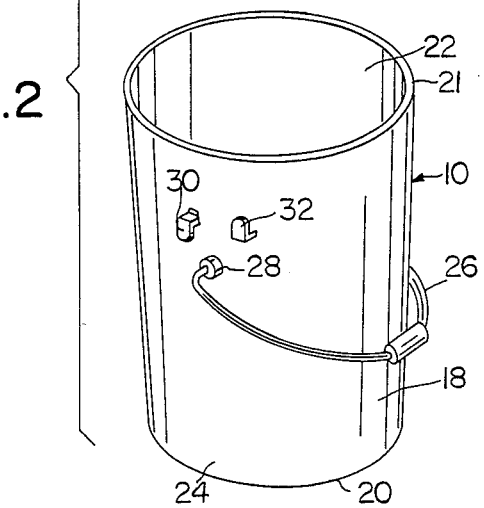
FIG. 4 is a fragmentary side view of the heater according to the invention showing the seat cover in position within the body.
Figure 4:
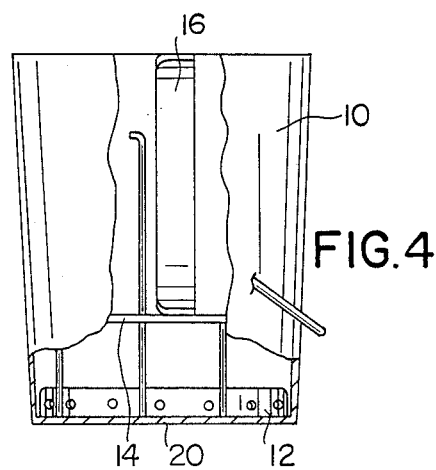
Figure 8:
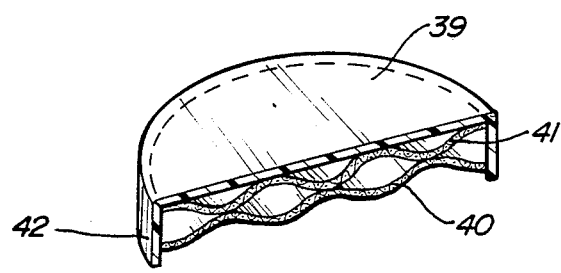
FIG. 8 is a partial section view of the seat cover.

In the preferred embodiment, the seat top 16 as shown in FIG. 8, is formed of a top sheet 39 and a bottom sheet 40 which are spaced apart by a W-shaped intermediate layer 41 to form a corrugated cross-section to support the weight of the user. A flange 42 extends downwardly from the bottom sheet 40 to engage the cylinder 18 to maintain the seat top in position. The seat top may be of any shape suitable for partially covering the open top and comfortably seating a person, such as semi-circular or trapezoidal. Extending from the bottom sheet 40 of the seat top are a pair of tabs 44 or hooks accepting the grate 14, as will be set forth more fully below. As shown in FIG. 1, the seat top 16 has a peripheral edge 47 defining an opening 46. The opening 46 remains at the top of the container when the seat top is in position. Heated air from the combusted fuel 38 heats the seat top and exits the opening 46 for warming the hands of the user. Thus, the outdoorsperson or ice fisherman may sit on the seat top or stand to the side of the container to warm the hands with the heat escaping from the opening 46. When the heater is not in use, the seat top 16 may be stored inside of the container, as shown in FIG. 4.

Figure 5:
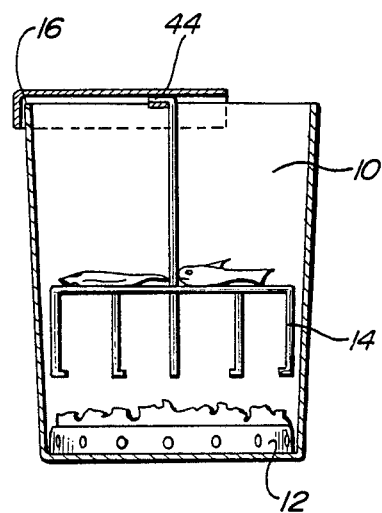
FIG. 5 is a cross-sectional view showing the FIG. 3 taken along lines 3—3.

As shown in FIG. 2, the grate 14 has six circumferentially spaced legs 48 and a pair of hangers 50. The legs 48 extend downwardly normal from the grate to support the grate above the combustible fuel in a cooking position as shown in FIG. 4. In the cooking position, food is supported in the normal fashion for cooking over the charcoal. The grate may be suspended in a heating position by the pair of hangers 50. Each of the pair of hangers has a rod extending normally to the grate with a free end bent to extend generally normal to the rod. The free ends of the hangers are formed to be accepted in the tabs 44 of the seat top, as best shown in FIG. 5. In the heating position, food 56 is supported further from the combustible material 38 than the cooking position when the grate 14 is supported on the legs 48. In the higher heating position, food may be kept warm.

Figure 7:
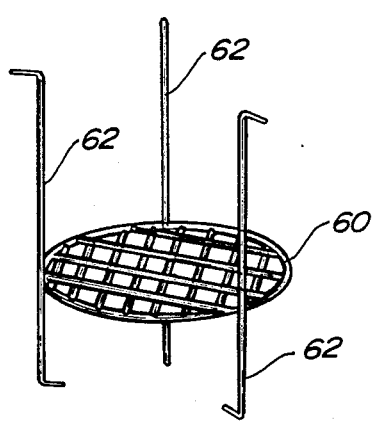
FIG. 7 is an alternative embodiment of the grill according to the invention.

Alternatively, as shown in FIG. 7, an alternative embodiment of a grate 60 is provided with three legs 62, extending normally in directions from the grate. The grate 60 is positioned approximately a third of the distance between the ends of the legs 62. The grate may be located in two different positions relative to the combustible material by inverting the grate. With a short portion of the legs extending downwardly towards the bottom of the container, the grate is positioned in a cooking position. Inverting the grate such that the longer portion of the legs extend downwardly to the bottom of the container positions the grate further from the combustible material for the warming of food.

Figure 6:
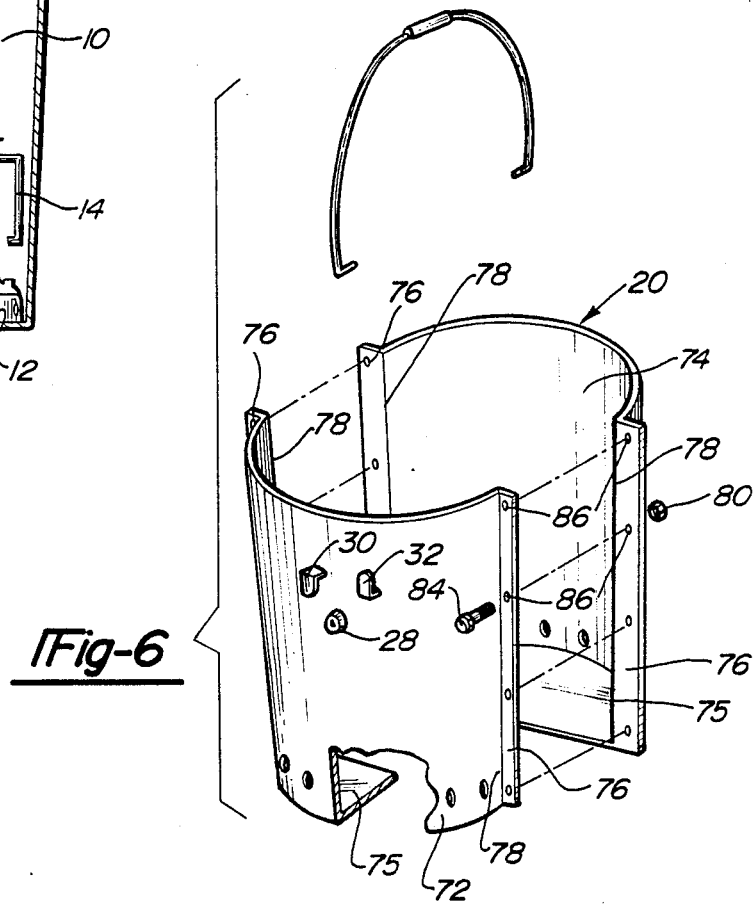
FIG. 6 is an exploded perspective view of an alternative embodiment of the invention.

As shown in FIG. 6, an alternative embodiment of the container is shown. There a container 70 is formed by joining two symmetrical semi-circular halves 72 and 74 along flanges 76 extending outwardly from each side edge 78 of the halves 72 and 74. Each half 72 and 74 is provided with a bottom portion 75 at one end. The flanges 76 are joined by use of conventional fasteners, such as a nut 80 and bolt 82, which extend through apertures 84 formed in the flanges 76. Arms 30 and 32 are mounted on one semi-circular bolt 72. The container is identical to the container 10 in other respects, and is provided with air holes 24 and mounts 28 for a handle 26. This embodiment of the invention may be easily assembled and disassembled for shipping, transportation and storage.

Thus is disclosed a compact, portable outdoor stove/heater having a warming seat and fishing pole support.

Having described my invention, many modifications thereto will become apparent to those skilled in the art to which it pertains without deviation from the spirit of the present invention, as defined by the scope of the appended claims.

I claim:

1. A portable heater for an outdoorsman, said heater comprising;
    a container having a body, extending between a closed bottom and a rim defining an open top; said body having a plurality of apertures for permitting the passage of air adjacent said bottom portion of said container;
    a bottom plate for supporting combustible material adapted to be received within said container; and a seat top extending partially over said open top of said container, said seat top having a seat portion and a flange extending downwardly therefrom, to extend about said container to close off said open top such that flames and smoke are prevented from escaping, said seat top further having a peripheral edge, said peripheral edge extending across said open top to define an opening between said rim and said peripheral edge extending coaxially with a longitudinal axis of said container whereby heat is permitted to escape from said container for warming the upper extremities of said outdoorsman, said seat portion being formed of heat conductive material for conducting heat to said outsdoorsman when in a seated position on said seat top.

2. The heater of claim 1 further comprising means for supporting a fishing pole.

3. The heater of claim 1 further comprising a grate, said grate having a plurality of legs for supporting food in a cooking position with respect to said combustible material.

4. The heater of claim 2, wherein said means for supporting a pair of spaced apart arms mounted to said body.

5. The heater of claim 4, wherein said pair of spaced apart arms open in opposing directions.

6. The heater of claim 3, wherein said grate comprises a pair of hangers.

7. The heater of claim 6, wherein said seat top comprises means for supporting said grate in a heating position within said container.

8. The heater of claim 7, wherein said means for supporting comprises a pair of tabs extending from said seat top and adapted to receive said hangers.

9. The heater of claim 1, wherein said container comprises a pair of semi-cylindrical halves and means for joining said pair of halves together.

10. The heater of claim 1, wherein said grate comprises a plurality of legs.

* * * * *